United States Patent Office 3,035,047
Patented May 15, 1962

3,035,047
PHTHALAMIDO PENICILLINS
Yvon G. Perron, 106 Stonecrest Drive, Dewitt, N.Y., and Lee C. Cheney, Woodchuck Hill Road, Fayetteville, N.Y.
No Drawing. Filed Sept. 25, 1961, Ser. No. 140,204
7 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to 6 - (N-substituted-phthalamido)penicillanic acids and nontoxic salts thereof.

This application is a continuation-in-part of our pending United States Patent application Serial No. 74,489, filed December 8, 1960 now abandoned, which is a continuation-in-part of United States application Serial No. 62,526, filed October 14, 1960 and now abandoned.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith.

There is provided, according to the present invention, a member selected from the group consisting of the acids having the formula

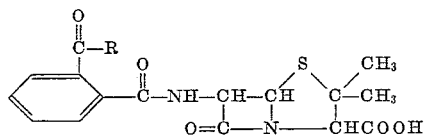

where R is a member selected from the group consisting of alkylamino, dialkylamino, cycloalkylamino containing from 3 to 7 carbon atoms, inclusive, allylamino, diallylamino, phenyl(lower)alkylamino, morpholino, lower-(alkyl)morpholino, di(lower)alkylmorpholine, morpholino(lower)alkylamino, pyrrolidino, (lower)alkylpyrrolidino, di(lower)alkylpyrrolidino, N-azepinyl, piperidino, lower(alkyl)piperidino, di(lower)alkylpiperidino, 1,2,5, 6-tetrahydropyridino, N-(lower)-alkylpiperazino, N-phenylpiperazino, N-(lower)alkyl)(lower)alkylpiperazino, N-(lower)alkyl - di-(lower)-alkylpiperazino, furfurylamino, tetrahydrofurfurylamino, N - (lower)alkyl - N - furfurylamino, N - alkyl - N-anilino, and (lower)alkoxyanilino, and nontoxic salts thereof, including nontoxic metallic salts such as sodium, potassium, calcium and aluminum, the ammonium salt and substituted ammonium salts, e.g., salts of such nontoxic amines as tri(lower)alkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabiethylethylenediamine, N-(lower)alkylpiperidine, and other amines which have been used to form salts with benzylpenicillin. The term "alkyl" as used herein refers to straight and branched chain saturated aliphatic hydrocarbon groups having from 1 to 12 carbon atoms inclusive and the "lower" alkyl groups are alkyl groups having from 1 to 6 carbon atoms inclusive. The preferred penicillins of the present invention are those in which R is an allyl radical or a "lower"alkyl group, particularly, n-propyl, isopropyl, n-amyl, n-butyl and t-butyl. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an anhydride of an acid having the formula

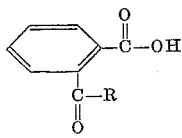

where R is as defined above, or its functional equivalents as an acylating agent for a primary amino group. Such equivalents include the corresponding mixed anhydrides with other carboxylic acids, including monoesters, and particularly lower aliphatic esters, of carbonic acid; such equivalents in certain cases include the acid chlorides and acid bromides of the above phthalamic acids.

The N-substituted phthalamic acids which are reacted with 6-aminopenicillanic acid in the preparation of the compounds of the present invention are readily prepared according to methods which are described in the technical literature and which are illustrated in Examples 1, 3 and 5 below. Phthalic anhydride and many of the amines used to prepare such phthalamic acids are commercially available and, in addition, can also be readily prepared according to known preparative techniques. Specific techniques for the preparation of certain of the phthalamic acids are described in Ber. 76, page 1144 (1943) and C. A. 45, page 8556i.

An elegant procedure for preparing a compound of the present invention by way of a mixed anhydride with ethoxy- or isobutoxy-carbonic acid comprises mixing 0.01 mole of phthalamic acid of the structure set forth above, 0.01 mole isobutyl chloroformate and 0.011 mol tertiary hydrocarbonyl or aliphatic amine such as triethylamine in an anhydrous, inert and preferably water-miscible solvent such as p-dioxane (e.g., 20 ml.) and, if desired, 2 ml. pure, dry acetone for about thirty minutes in the cold, e.g., at about 4° C. To this solution of the mixed anhydride there is added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol.

These salts are usually insoluble in solvents such as ether and can be recovered in pure form by simple filtration.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should, in general, not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the reaction, the products are isolated, if desired, by the techniques used with benzylpenicillin and phenoxymethylpenicillin. Thus the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms precipitates, usually in crystalline form, and is collected by filtration or decantation.

6-aminopenicillanic acid is prepared according to Batchelor et al. (Nature 183, 257–258, January 24, 1959), Belgian Patent 569,728 or United States Patent No. 2,941,995. It is used in the above reaction as the salt of a metal or a tertiary hydrocarbonyl amine or as an ester of a hydrocarbonyl alcohol.

Hydrocarbonyl alcohols and tertiary hydrocarbonyl amines are compounds having the formulae

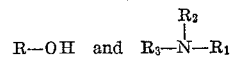

wherein the R groups contain only the elements carbon and hydrogen.

The following examples will serve to illustrate this invention without limiting it thereto.

EXAMPLE 1

Preparation of N-Allylphthalamic Acid

Phthalic anhydride (0.5 mole; 74.0 gm.) and 300 ml. of benzene is mixed in a 1 liter, three-necked, round bottom flask. The mixture is stirred for 20 minutes and a mixture of allylamine (0.5 ml.; 28.5 gm.) in 100 ml. of benzene is added dropwise over a period of ½ hour and the resulting mixture is stirred for 20 minutes at room temperature. The reaction mixture is then placed on a steam bath and refluxed for one hour. The mixture is then allowed to cool to room temperature, is then placed in an ice bath for about 20 minutes whereupon the product is precipitated. The product, N-allylphthalamic acid, is removed by filtration, dried overnight in a desiccator and found to weigh 92.4 gms. and have a melting point of 115°–117° C. The product is recrystallized from acetone and the recrystallized product is found to weigh 60.2 gms. and have a melting point of 115–117° C.

*Analysis.*—Calculated: C, 64.38%; H, 5.40%. Found: C, 64.40%; H, 5.50%.

EXAMPLE 2

Preparation of Potassium 6-(Allyl-N'-Phthalamido)-Penicillanate

Ethyl chloroformate (10 ml.) is added dropwise with stirring to a solution at about $-5°$ C. of N-allylphthalamic acid (20.52 gms.; 0.1 mole), 14 ml. triethylamine, 70 ml. of p-dioxane and 30 ml. of dry acetone. After stirring for 15 minutes at $-5°$ C., a solution of 6-aminopenicillanic acid (21.6 gms.; 0.1 mole), 50 ml. of water previously chilled to 0° C. and 15 ml. of triethylamine is added in one portion. The reaction mixture is stirred vigorously at 0° C. for 2 hours. The reaction mixture is diluted with an equal volume of water and extracted three times with methyl isobutyl ketone and the ether extracts are discarded. The cold aqueous solution is layered with methyl isobutyl ketone and acidified to pH 2 with 42% phosphoric acid. The acidified solution is extracted with 700 ml. of methyl isobutyl ketone in three portions. The methyl isobutyl ketone extracts, which contain 6-(N-allyl-N'-phthalamido)penicillanic acid, are washed once with water, dried with sodium sulfate, filtered and treated with a solution of potassium 2-ethylhexanoate in ether. The solvent is decanted from the product which is then covered with 400 ml. of acetone. The solid product, potassium 6-(N-allyl-N'-phthalamido)penicillanate, is then collected by filtration, dried in vacuo over $P_2O_5$, found to weigh 20.0 gms., to contain the β-lactam structure as shown by infrared analysis, to inhibit *Staph. aureus* Smith at a concentration of 0.8 mcg./ml. and to exhibit versus *Staph. aureus* Smith upon intramuscular injection in mice a $CD_{50}$ of 6.8 mcg./kg.

EXAMPLE 3

Preparation of N-Benzylphthalamic Acid

Phthalic anhydride (0.5 mole; 74.0 gm.) and 200 ml. of acetone is mixed in a 1 liter, three-necked, round bottom flask equipped with a condenser, stirrer and dropping funnel and a steam bath is used to dissolve the anhydride. Benzylamine (0.5 mole; 53.0 gm.) in 50 ml. of acetone is added dropwise to the solution over a ½ hour period whereupon the product, N-benzylphthalamic acid, precipitates. An additional 200 ml. of acetone is then added to the reaction mixture which is heated to reflux for ½ hour. The reaction mixture is then cooled to room temperature. The product is recovered by filtration, washed with 60 ml. acetone and dried in vacuo. The crude product (which weighs 111.4 gms.) is recrystallized from acetone, dried, found to weigh 87.2 gms. and to melt at 155–156° C.

*Analysis.*—Calculated: C, 70.58%; H, 5.13%. Found: C, 70.72%; H, 5.41%.

EXAMPLE 4

*Preparation of 6-(N-Benzyl-N'-Phthalamido)Penicillanic Acid and the Sodium Salt Thereof*

Triethylamine (13.9 gms.; 0.1 mole) is added in one portion to a suspension of N-benzylphthalamic acid (25.5 gms.; 0.1 mole) in 150 ml. of tetrahydrofuran whereupon a solution is formed. The solution is cooled to about —5° C. and isobutyl chloroformate (13.7 gms.; 0.1 mole) is added dropwise while the temperature of the solution is maintained at about —5° C. The resulting reaction mixture is stirred for ½ hour and there is added in one portion a chilled solution of 6-aminopenicillanic acid (21.6 gms.; 0.1 mole) in 40 ml. of water and 15 ml. of triethylamine. The resulting reaction mixture is stirred for ½ hour at —5° C. in a cooling bath and thereafter at room temperature for two hours. The reaction mixture is diluted with an equal volume of water and extracted twice with methyl isobutyl ketone, the extracts being discarded. The aqueous solution is layered with methyl isobutyl ketone, chilled and acidified to pH 2 with 42.5% phosphoric acid. The acidified aqueous solution which contains 6-(N-benzyl-N'-phthalamido)penicillanic acid is extracted twice with methyl isobutyl ketone and the combined extracts are washed with chilled water, filtered through sodium sulfate and dried over sodium sulfate. The sodium sulfate is then removed from the extracts and 33.2 ml. of a 50% solution of sodium 2-ethylhexanoate is added whereupon a precipitate is formed. The precipitate, the sodium salt of 6-(N-benzyl-N'-phthalamido)penicillanic acid, is collected by filtration, slurried with acetone, refiltered, air-dried and then dried in vacuo over $P_2O_5$. The product is found to weight 11.8 gms., to contain the β-lactam structure as shown by infrared analysis, to inhibit *Staph. aureus* Smith at a concentration of 0.4 mcg./ml., to exhibit versus *Staph. aureus* Smith upon intramuscular injection in mice a $CD_{50}$ of 17 mcg./kg., and to have the following carbon and hydrogen analysis.

Calculated for $C_{23}H_{22}N_3O_5Sna$: C, 58.1%; H, 4.66%. Found: C, 54.65%; H, 4.75%.

EXAMPLE 5

*Preparation of N-n-Propylphthalamic Acid*

To a warm stirred solution of phthalic anhydride (74.0 gms.; 0.5 mole) in 200 ml. of acetone is added dropwise over a 10 minute period n-propyl amine (35.5 gms.; 0.6 mole). During the addition of the amine reflux conditions are maintained by the rate of addition of the amine. Additional acetone (75 mls.) is added during the addition of the amine to dilute the suspension of precipitated solids. The reaction mixture is then refluxed for an additional three hours and cooled to room temperature. After standing several hours at room temperature, the suspension is chilled, filtered, and the filtrate is concentrated and a second crop of precipitate collected. The solids recovered by filtration are recrystallized from methyl isobutyl ketone and dried in vacuo over $P_2O_5$. The product, N-n-propylphthalamic acid, is found to weight 35.6 gms. and to melt at 124–128° C. This product is again recrystallized from dimethylformamide and ether and the recrystallized product is found to weight 29.2 gms. and to have a melting point of 141.5–142° C. Upon a third recrystallization the melting point of the product is raised to 142–142.5° C. Infrared analysis indicated that the product contained no imide and titration indicated a purity of approximately 75%. The product had a carbon and hydrogen analysis as follows: Calculated for $C_{11}H_{14}NO_3$: Calculated: C, 63.75%; H, 6.32%. Found: C, 63.53%; H, 7.70%.

EXAMPLE 6

*Preparation of 6-(N-n-Propyl-N'-Phthalamido)-Penicillanic Acid and the Potassium Salt Thereof*

Triethylamine (13.9 gms.; 0.1 mole) is added in one portion to a suspension of N-n-propylphthalamic acid (20.7 gms.; 0.1 mole) in 100 ml. of tetrahydrofuran whereupon a solution is formed. The solution is cooled in an ice-salt-acetone bath and isobutyl chloroformate (13.7 gms.; 0.1 mole) is added dropwise while the temperature of the solution is maintained at the temperature of the cooling bath. The resulting reaction mixture is stirred for ½ hour and there is added in one portion a chilled solution of 6-aminopenicillanic acid (21.6 gms.; 0.1 mole) in 40 ml. of water and 15 ml. of triethylamine. The resulting reaction mixture is removed from the cooling bath, stirred at room temperature for 2½ hours and then diluted with an equal volume of water and extracted twice with methyl isobutyl ketone, the extracts being discarded. The aqueous solution is layered with methyl isobutyl ketone, chilled, and acidified to pH 2 with 42.5% phosphoric acid. The acidified aqueous solution, which contains 6-(N-n-propyl-N'-phthalamido)penicillanic acid, is extracted twice with methyl isobutyl ketone and the combined extracts are washed with chilled water, filtered through sodium sulfate and dried over sodium sulfate. The sodium sulfate is then removed from the extracts and 40 ml. of a 50% solution of potassium 2-ethylhexanoate in n-butanol is added whereupon a precipitate is formed. The precipitate, the potassium salt of 6-(N-n-propyl-N'-phthalamido)penicillanic acid, is collected by filtration, slurried with acetone, refiltered, air-dried and then dried in vacuo over $P_2O_5$. The product is found to weigh 22.5 gms., to contain the β-lactam structure as shown by infrared analysis, to inhibit *Staph. aureus* Smith at a concentration of 1.6 mcg./ml. and to have the following carbon and hydrogen analysis calculated for

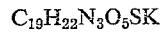

$C_{19}H_{22}N_3O_5SK$

Calculated: C, 51.5%; H, 5.00%. Found: C, 48.9%; H, 5.28%.

EXAMPLE 7

*Preparation of 6-(N-n-Amyl-N'-Phthalamido)-Penicillanic Acid and Its Potassium Salt*

Triethylamine (13.9 gms.; 0.1 mole) is added in one portion to a suspension of N-n-amylphthalamic acid (23.5 gms.; 0.1 mole, prepared by the method of Example 5) in 150 ml. of tetrahydrofuran whereupon a solution is formed. The solution is cooled to about —5° C. and isobutyl chloroformate (13.6 gms.; 0.1 mole) in 20 ml. of tetrahydrofuran is added dropwise while the temperature of the solution is maintained at about —5° C. The resulting reaction mixture is stirred for ½ hour at about 0° C. and there is added in one portion a chilled solution of 6-aminopenicillanic acid (21.6 gms.; 0.1 mole) in 60 ml. of water and 15 ml. of triethylamine. The resulting reaction mixture is stirred for ½ hour on the cooling bath and thereafter stirred at room temperature for 2 hours. The reaction mixture is diluted with an equal volume of water and extracted twice with methyl isobutyl ketone, the extracts being discarded. The aqueous solution is layered with methyl isobutyl ketone, chilled, and acidified to pH 2 with 42.5% phosphoric acid. The acidified aqueous solution which contains 6-(N-n-amyl-N'-phthalamido)penicillanic acid is extracted twice with methyl isobutyl ketone and the combined extracts are washed with chilled water, filtered through sodium sulfate and dried over sodium sulfate.

The sodium sulfate is then removed from the extracts and 40 ml. of a 50% solution of potassium 2-ethylhexanoate in n-butanol is added whereupon a precipitate is formed. The precipitate, the potassium salt of 6-(N-n-amyl-N'-phthalamido)penicillanic acid, is collected by filtration, slurried with acetone, refiltered, air-dried and then dried in vacuo over $P_2O_5$. The product is found to weigh 28.0 gms., to decompose at 140–145° C., to contain the $\beta$-lactam structure as shown by infrared analysis, to inhibit *Staph. aureus* Smith at a concentration of 0.8 mcg./ml. and to have the following carbon and hydrogen analysis calculated for $C_{21}H_{26}N_3O_5SK$: C, 53.5%; H, 5.52%. Found: C, 49.65%; H, 5.18%.

EXAMPLE 8

*Preparation of 6-(N-Furfuryl-N'-Phthalamido)-Penicillanic Acid and Its Potassium Salt*

Triethylamine (15 ml.) is added in one portion to a suspension of N-furfurylphthalamic acid (24.5 gms.; 0.1 mole; prepared as in the method of Example 5) in 150 ml. of tetrahydrofuran whereupon a solution is formed. The solution is cooled to about —5° C. and isobutyl chloroformate (13.6 gms.; 0.1 mole) in 20 ml. of tetrahydrofuran is added dropwise while the temperature of the solution is maintained at about —5° C. The resulting reaction mixture is stirred for ½ hour at about 0° C. and there is added in one portion a chilled solution of 6-aminopenicillanic acid (21.6 gms.; 0.1 mole) in 60 ml. of water and 15 ml. of triethylamine. The resulting reaction mixture is stirred for ½ hour in the cooling bath and thereafter stirred at room temperature for 2 hours. The reaction mixture is diluted with an equal volume of water and extracted twice with methyl isobutyl ketone, the extracts being discarded. The aqueous solution is layered with methyl isobutyl ketone, chilled, and acidified to pH 2 with 42.5% phosphoric acid. The acidified aqueous solution which contains 6-(N-furfuryl-N'-phthalamido)penicillanic acid is extracted twice with methyl isobutyl ketone and the combined extracts are washed with chilled water, filtered through sodium sulfate and dried over sodium sulfate. The sodium sulfate is then removed from the extracts and 40 ml. of a 50% solution of potassium ethylhexanoate in n-butanol is added whereupon a precipitate is formed. The precipitate, the potassium salt of 6-(N-furfuryl-N'-phthalamido)-penicillanic acid, is collected by filtration, slurried with acetone, refiltered, air-dried and then dried in vacuo over $P_2O_5$. The product is found to weigh 26.5 gms., to decompose at 120° C., to contain the $\beta$-lactam structure as shown by infrared analysis, to inhibit *Staph. aureus* Smith at a concentration of 0.8 mcg./ml. and to have the following carbon and hydrogen analysis: Calculated for $C_{21}H_{20}N_3O_6SK$: C, 52.39%; H, 4.15%. Found: C, 49.5%; H, 5.01%.

EXAMPLE 9

*Preparation of 6-(N-1,2,5,6-Tetrahydropyridyl-N'-Phthalamido)Penicillanic Acid and Its Potassium Salt*

Triethylamine (15 ml.) is added in one portion to a suspension of N-1,2,5,6-tetrahydropyridyl-N'-phthalamic acid (23.1 gms.; 0.1 mole; prepared as in the method of Example 5) in 150 ml. of tetrahydrofuran whereupon a solution is formed. The solution is cooled to about —5° C. and isobutyl chloroformate (13.6 gms.; 0.1 mole) in 30 ml. of tetrahydrofuran is added dropwise while the temperature of the solution is maintained at about —5° C. The resulting reaction mixture is stirred for ½ hour at about 0° C. and added in one portion to a chilled solution of 6-aminophenicillanic acid (21.6 gms.; 0.1 mole) in 60 ml. of water and 15 ml. of triethylamine. The resulting reaction mixture is stirred for ½ hour in the cooling bath and thereafter stirred at room temperature for 2 hours. The reaction mixture is diluted with an equal volume of water and extracted twice with methyl isobutyl ketone, the extracts being discarded. The aqueous solution is layered with methyl isobutyl ketone, chilled, and acidified to pH 2 with 42.5% phosphoric acid. The acidified aqueous solution which contains 6-(N-1,2,5,6-tetrahydropyridyl-N'-phthalamido)penicillanic acid is extracted twice with methyl isobutyl ketone and the combined extracts are washed with chilled water, filtered through sodium sulfate and dried over sodium sulfate. The sodium sulfate is then removed from the extracts and 40 ml. of a 50% solution of potassium ethylhexanoate in n-butanol is added. Concentration of the solution in vacuo and dilution with dry ether yielded a solid. The precipitate, the potassium salt of 6-(N-1,2,5,6-tetrahydropyridyl-N'-phthalamido)penicillanic acid, is collected by filtration, slurried with acetone, refiltered, air-dried and then dried in vacuo over $P_2O_5$. The product is found to weigh 37.5 gms., to decompose over 140° C., to contain the $\beta$-lactam structure as shown by infrared analysis, to inhibit *Staph. aureus* Smith at a concentration of 0.4 mcg./ml. and to have the following carbon and hydrogen analysis: Calculated for $C_{21}H_{22}N_3O_5SK$: C, 53.96%; H, 4.71%. Found: C, 49.90%; H, 5.56%.

EXAMPLE 10

*Preparation of Potassium 6-(N,N-Tetramethylene-N'-Phthalamido)Penicillanate*

Ethyl chloroformate (10 ml.) is added dropwise with stirring to a solution at about —5° C. of N,N-tetramethylene-N'-phthalamic acid (21.9 gms.; 0.1 mole), 14 ml. triethylamine, 70 ml. of p-dioxane and 30 ml. of dry acetone. After stirring for 15 minutes at —5° C. a solution of 6-aminopenicillanic acid (21.6 gms.; 0.1 mole), 50 ml. of water previously chilled to 0° C. and 14 ml. of triethylamine is added in one portion. The reaction mixture is stirred vigorously at 0° C. for 2 hours. The reaction mixture is extracted three times with methyl isobutyl ketone and the extracts discarded. The cold aqueous solution is layered with methyl isobutyl ketone and acidified to pH 2 with 42% phosphoric acid. The acidified solution is extracted with 700 ml. of methyl isobutyl ketone in three portions. The methyl isobutyl ketone extracts, which contain 6-(N,N-tetramethylene-N'-phthalamido)penicillanic acid, are dried with sodium sulfate, filtered and treated with a solution of potassium 2-ethylhexanoate in n-butanol. The solution is concentrated in vacuo, diluted with dry ether, and the product collected and washed with acetone. The solid product, potassium 6-(N,N - tetramethylene - N' - phthalamido)penicillanate, after drying in vacuo over $P_2O_5$, is found to weigh 21.0 gms., to melt with decomposition at 150° C., to contain the $\beta$-lactam structure as shown by infrared analysis, to inhibit *Staph. aureus* Smith at a concentration of 1.6 mcg./ml. and to exhibit versus *Staph. aureus* Smith upon intramuscular injection in mice in a $CD_{50}$ of 9 mcg./kg.

EXAMPLE 11

*Preparation of Potassium 6-[N-(2-Phenylethyl)-N'-Phthalamido]Penicillanate*

Ethyl chloroformate (10 ml.) is added dropwise with stirring to a solution at about —5° C. of N-(2-phenylethyl)phthalamic acid (26.9 gms.; 0.1 mole), 14 ml. triethylamine, 70 ml. of p-dioxane and 30 ml. of dry acetone. After stirring for 15 minutes at —5° C. a solution of 6-aminopenicillanic acid (21.6 gms.; 0.1 mole), 50 ml. of water previously chilled to 0° C. and 15 ml. of triethylamine is added in one portion. The reaction mixture is stirred vigorously at 0° C. for 2 hours. The reaction mixture is extracted three times with methyl isobutyl ketone and the extracts are discarded. The cold aqueous solution is layered with methyl isobutyl ketone and acidified to pH 2 with 42% phosphoric acid. The acidified solution is extracted with 700 ml. of methyl isobutyl ketone in three portions. The ether extracts, which contain 6-[N-(2-phenylethyl) - N' - phthalamido]penicillanic acid, are dried with sodium sulfate, filtered and treated with a solution of potassium 2-ethylhexanoate in n-butanol. The solvent is decanted from the product which is then covered with 400 ml. of acetone. The solid product, potassium 6-[N-(2-phenylethyl)-N'-phthalamido]penicillanate, is then collected by filtration, dried in vacuo over $P_2O_5$, found to weight 21.6 gms., to melt with decomposition at 130° C., to contain the $\beta$-lactam structure as shown by infrared analysis, to inhibit *Staph. aureus* Smith at a concentration of 0.8 mcg./ml. and to exhibit versus *Staph. aureus* Smith upon intramuscular injection in mice a $CD_{50}$ of 23 mcg./kg.

EXAMPLE 12

*Preparation of Potassium 6-(N,N-Pentamethylene-N'-Phthalamido)Penicillanate*

Ethyl chloroformate (10 ml.) is added dropwise with stirring to a solution at about —5° C. of N,N-pentamethylenephthalamic acid (23.3 gms.; 0.1 mole), 14 ml. triethylamine, 70 ml. p-dioxane and 30 ml. dry acetone. After stirring for 15 minutes at —5° C. a solution of 6-aminopenicillanic acid (21.6 gms.; 0.1 mole), 50 ml. of water previously chilled to 0° C. and 14 ml. of triethylamine is added in one portion. The reaction mixture is stirred vigorously at 0° C. for 2 hours. The reaction mixture is extracted three times with ether and the ether extracts are discarded. The cold aqueous solution is layered with methyl isobutyl ketone and acidified to pH 2 with 42% phosphoric acid. The acidified solution is extracted with 700 ml. of methyl isobutyl ketone in three portions. The methyl isobutyl ketone extracts, which contain 6-(N,N-pentamethylene-N'-phthalamido) penicillanic acid, are dried with sodium sulfate, filtered and treated with a solution of potassium 2-ethylhexanoate in n-butanol. The solution is concentrated in vacuo and diluted with dry ether to produce a precipitate. The solid product, potassium 6-(N,N-pentamethylene-N'-phthalamido)penicillanate, which may also be termed 6-(N-piperidino-N'-phthalamido)penicillanate, is then collected by filtration, dried in vacuo over $P_2O_5$, found to weigh 40.0 gms., to melt at 150° C. with decomposition, to contain the $\beta$-lactam structure as shown by infrared analysis, to inhibit *Staph. aureus* Smith at a concentration of 6.25 mcg./ml. and to exhibit versus *Staph. aureus* Smith upon intramuscular injection in mice a $CD_{50}$ of 28 mcg./kg.

EXAMPLE 13

*Preparation of 6-(N-Isopropyl-N'-Phthalamido)-Penicillanic Acid and its Potassium Salt*

Triethylamine (13.9 gms.; 0.1 mole) is added in one portion to a suspension of N-isopropylphthalamic acid (20.5 gms.; 0.1 mole; prepared as in the method of Example 5) in 100 ml. of tetrahydrofuran whereupon a solution is formed. The solution is cooled to about —12° C. and isobutyl chloroformate (13.7 gms.; 0.1 mole) in 20 ml. of tetrahydrofuran is added dropwise over a 20 minute period while the temperature of the solution is maintained at about —10° C. The resulting reaction mixture is stirred for ½ hour at about 0° C. and there is added in one portion a chilled solution of 6-aminopenicillanic acid (21.6 gms.; 0.1 mole) in 40 ml. of water and 15 ml. of triethylamine. The resulting reaction mixture is stirred for 3 hours at from —10° C. and thereafter stirred at room temperature for 1 hour. The reaction mixture is diluted with an equal weight of water and extracted twice with methyl isobutyl ketone, the extracts being discarded. The aqueous solution is layered with methyl isobutyl ketone, chilled, and acidified to pH 2 with 42.5% phosphoric acid. The acidified aqueous solution which contains 6-(N-isopropyl-N'-phthalamido)-penicillanic acid is extracted twice with methyl isobutyl ketone and the combined extracts are washed with chilled water, filtered through sodium sulfate and dried over sodium sulfate. The sodium sulfate is then removed from the extracts and 40 ml. of a 50% solution of potassium 2-ethylhexanoate in n-butanol is added. The mixture concentrated in vacuo to dryness and n-pentane is added to the precipitate. The precipitate, the potassium salt of 6-(N-isopropyl-N'-phthalamido)penicillanic acid, is collected by filtration, air-dried and then dried in vacuo over $P_2O_5$. The product, which retains some moisture, is found to weigh 15.3 gms., to contain the $\beta$-lactam structure as shown by infrared analysis, to inhibit *Staph. aureus* Smith at a concentration of 3.12 mcg./ml. and to exhibit versus *Staph. aureaus* Smith upon intramuscular injection in mice a $CD_{50}$ of 19 mcg./kg.

EXAMPLE 14

*Preparation of 6-(N-α-Methylbenzyl-N'-Phthalamido)-Penicillanic Acid and its Sodium Salt*

In the general procedure of Example 4, the N-benzylphthalamic acid is replaced by 0.1 mole of N-(α-methylbenzyl)-phthalamic acid and there is obtained the sodium salt of 6-(N-α-methylbenzyl-N'-phthalamido)penicillanic acid which is found to weight 11.0 gms., to contain the $\beta$-lactam ring as shown by infrared analysis, to inhibit *Staph. aureus* Smith at 1.6 mcg./ml., to exhibit versus *Staph. aureus* Smith upon intramuscular injection in mice a $CD_{50}$ of 25 mcg./kg. and to have the following carbon and hydrogen analysis: Calculated for $C_{24}H_{24}N_3O_5SNa$: C, 58.9%; H, 4.94%. Found: C, 56.5%; H, 5.14%.

EXAMPLE 15

*Preparation of 6-(N-Hexamethylene-N'-Phthalamido)-Penicillanic Acid and its Potassium Salt*

In the general procedure of Example 8, the N-furfurylphthalamic acid is replaced by 0.1 mole of N-hexamethylene-phthalamic acid and there is obtained the potassium salt of 6-(N-hexamethylene-N'-phthalamido)penicillanic acid which is found to weight 40.5 gms., to contain the $\beta$-lactam ring as shown by infrared analysis, to inhibit *Staph. aureus* Smith at 1.6 mcg./ml. and to exhibit versus *Staph. aureus* Smith upon intramuscular injection in mice a $CD_{50}$ of 9 mcg./kg.

EXAMPLE 16

*Preparation of 6-(N-Tetrahydrofurfuryl-N'-Phthalamido) Penicillanic Acid and its Potassium Salt*

In the general procedure of Example 8, the N-furfurylphthalamic acid is replaced by 0.1 mole of N-tetrahydrofurfuryl-phthalamic acid and there is obtained the potassium salt of 6-(N-tetrahydrofurfuryl-N'-phthalamido)-penicillanic acid which is found to weight 33.0 gms., to contain the $\beta$-lactam ring as shown by infrared analysis and to inhibit *Staph. aureus* Smith at 1.6 mcg./ml.

EXAMPLE 17

In the general procedure of Example 2, the N-allylphthalamic acid is replaced by 0.1 mole of N-morpholinophthalamic acid, N-(2,6-dimethylmorpholino)phthalamic acid and N,N-dibutylphthalamic acid, respectively, and there is thereby obtained the potassium salt of 6-(N-morpholino-N'-phthalamido)penicillanic acid (25.0 gm.; M.P. 165° C. with decomposition), 6-[N-(2,6-dimethylmorpholino)-N'-phthalamido]penicillanic acid (43.0 gm.; M.P. 108–113° C. with decomposition), and 6-(N,N-di-n-butylphthalamido)penicillanic acid (24 gm.; M.P. 115–120° C. with decomposition), respectively, each of which is isolated as a solid potassium salt which is found to contain the $\beta$-lactam ring as shown by infrared analysis and to inhibit *Staph. aureus* Smith at concentrations of 3.12 mcg./ml., >6.25 mcg./ml., and 1.6 mcg./ml., respectively.

EXAMPLE 18

*Preparation of 6-[o-(2-Methyl-1,2,3,4-Tetrahydroquinolyl-Carbonyl)-Benzamido]Penicillanic Acid and its Potassium Salt*

In the general procedure of Example 8, the N-furfurylphthalamic acid is replaced by 0.1 mole of N-1,2,3,4-tetrahydroquinaldinephthalamic acid and there is obtained the potassium salt of 6-[o-(2-methyl-1,2,3,4-tetrahydroquinolyl-carbonyl)-benzamido]penicillanic acid which is found to weight 43.5 gms., to contain the $\beta$-lactam ring as shown by infrared analysis, to decompose at 150° C., to inhibit *Staph. aureus* Smith at 1.6 mcg./ml., to exhibit versus *Staph. aureus* Smith upon intramuscular injection in mice a $CD_{50}$ of 45 mcg./kg. and to have the following carbon and hydrogen analysis: Calculated for $C_{26}H_{26}N_3O_5SK$: C, 58.75%; H, 4.89%. Found: C, 58.15%; H, 5.52%.

EXAMPLE 19

*Preparation of 6-(N,N-Diallyl-N'-Phthalamido)-Penicillanic Acid and Its Potassium Salt*

Triethylamine (0.1 mole; 13.9 gms.) is added in one portion to a suspension of N,N-diallylphthalamic acid (24.5 gms.; 0.1 mole; prepared as in the method of Example 1) in 100 ml. of tetrahydrofuran whereupon a solution is formed. The solution is cooled in about —5° C. and isobutyl chloroformate (13.6 gms.; 0.1 mole) in 20 ml. of tetrahydrofuran is added dropwise while the temperature of the solution is maintained at about —5° C. The resulting reaction mixture is stirred for ½ hour at about 0° C. and there is added in one portion a chilled solution of 6-aminopenicillanic acid (21.6 gms.; 0.1 mole) in 60 ml. of water and 15 ml. of triethylamine. The resulting reaction mixture is stirred for ½ hour in the cooling bath and thereafter stirred at room temperature for 2 hours. The reaction mixture is diluted with an equal volume of water and extracted twice with methyl isobutyl ketone, the extracts being discarded. The aqueous solution is layered with methyl isobutyl ketone, chilled, and acidified to pH 2 with 42.5% phosphoric acid. The acidified aqueous solution which contains 6-(N,N-diallyl-N'-phthalamido)-penicillanic acid is extracted twice with methyl isobutyl ketone and the combined extracts are washed with chilled water, filtered through sodium sulfate and dried over sodium sulfate. The sodium sulfate is then removed from the extracts and 40 ml. of a 50% solution of potassium 2-ethylhexanoate in n-butanol is added and the solution is concentrated to a low volume and diluted with ether whereupon a precipitate is formed. The precipitate, the potassium salt of 6-(N,N-diallyl-N'-phthalamido penicillin acid, is collected by filtration, slurried with acetone, refiltered, air-dried and then dried in vacuo over $P_2O_5$. The product is found to weigh 40.5 gms., to contain the $\beta$-lactam structure as shown by infrared analysis, to inhibit *Staph. aureus* Smith at a concentration of 0.8 mcg./ml. and to exhibit versus *Staph. aureus* Smith upon intramuscular injection in mice a $CD_{50}$ of 4 mcg./kg.

EXAMPLE 20

In the general procedure of Example 19, the N,N-diallylphthalamic acid is replaced by 0.1 mole of N,N-diisopropylphthalamic acid, N,N-diethylphthalamic acid, and N,N-dimethylphthalamic acid, respectively, and there is obtained the potassium salt of 6-(N,N-diisopropyl-N'-phthalamido)penicillanic acid, 6-(N,N-diethyl-N'-phthalamido)penicillanic acid, and 6-(N,N-dimethyl-N'-phthalamido)penicillanic acid, respectively, each of which is isolated as a solid potassium salt which is found to contain the $\beta$-lactam ring as shown by infrared analysis and to inhibit *Staph. aureus* Smith at concentrations of 0.001% by weight.

EXAMPLE 21

*Preparation of 6-(N-Dodecyl-N'-Phthalamido)-Penicillanic Acid and Its Potassium Salt*

In the general procedure of Example 7, the N-amylphthalamic acid is replaced by 0.1 mole of N-dodecylphthalamic acid and there is obtained the solid water-soluble potassium salt of 6-(dodecyl-N'-phthalamido)-penicillanic acid which is found to weigh 10.5 gms., to contain the $\beta$-lactam ring as shown by infrared analysis and to inhibit *Staph. aureus* Smith at 0.4 mcg./ml.

EXAMPLE 22

*Preparation of 6-(N-t-Butyl-N'-Phthalamido)-Penicillanic Acid and Its Potassium Salt*

Triethylamine (13.9 gms.; 0.1 mole) is added in one portion to a suspension of N-t-butylphthalamic acid (22.1 gms.; 0.1 mole; prepared as in the method of Example 5) in 100 ml. of tetrahydrofuran whereupon a solution is formed. The solution is cooled to about —5° C. and ethyl chloroformate (13.7 gms.; 0.1 mole) in 20 ml. of tetrahydrofuran is added dropwise over a 20 minute period while the temperature of the solution is maintained at about —10° C. The resulting reaction mixture is stirred for ½ hour at about 0° C. and there is added in one portion a chilled solution of 6-aminopenicillanic acid (21.6 gms.; 0.1 mole) in 50 ml. of water and 15 ml. of triethylamine. The resulting reaction mixture is stirred for 1½ hours at temperatures of from —5° C. to 5° C. and thereafter stirred at room temperature until evolution $CO_2$ ceases. The reaction mixture is diluted with an equal weight of water and extracted twice with methyl isobutyl ketone, the extracts being discarded. The aqueous solution is layered with methyl isobutyl ketone, chilled, and acidified to pH 2 with 42.5% phosphoric acid. The acidified aqueous solution which contains 6-(N-t-butyl-N'-phthalamido)penicillanic acid is extracted twice with methyl isobutyl ketone and the combined extracts are washed with chilled water, filtered through sodium sulfate and dried over sodium sulfate. The sodium sulfate is then removed from the extracts and 45 ml. of a 40% solution of potassium 2-ethylhexanoate in n-butanol is added whereupon a precipitate is formed. The mixture concentrated in vacuo to dryness. The precipitate, the potassium salt of 6-(N-t-butyl-N'-phthalamido)penicillanic acid, is collected by filtration, air-dried and then dried in vacuo over $P_2O_5$. The product, which retains some moisture, is found to weigh 24.0 gms., to have a melting point of 136–137° C. (with decomposition), to contain the $\beta$-lactam structure as shown by infrared analysis, to inhibit *Staph. aureus* Smith at a concentration of 3.12 mcg./ml. and to exhibit versus *Staph. aureus* Smith and a penicillin G-resistant strain of *Staph. aureus* upon intramuscular injection in mice a $CD_{50}$ of 27 mcg./kg. and 20 mcg./kg., respectively.

EXAMPLE 23

In the general procedure of Example 13, the N-isopropylphthalamic acid is replaced by 0.1 mole N-methylphthalamic acid, 0.2 mole N-ethylphthalamic acid, 0.2 mole N-isobutylphthalamic acid, and 0.1 mole $\alpha$-methylpropylphthalamic acid, respectively, and there is thereby obtained the potassium salt of 6-(N-methyl-N'-phthalamido)penicillanic acid, 6-(N-ethyl-N'-phthalamido)-penicillanic acid, 6-(N-isobutylphthalamido)penicillanic acid and 6(N-$\alpha$-methylpropylphthalamido)penicillanic acid, respectively, each of which is isolated as a solid potassium salt which is found to contain the $\beta$-lactam ring as shown by infrared analysis and to inhibit *Staph. aureus* Smith at concentrations of 6.25 mcg./ml., 3.12 mcg./ml., 0.8 mcg./ml., and 3.1 mcg./ml., respectively.

EXAMPLE 24

In the general procedure of Example 11, the N-(2-phenylethyl)phthalamic acid is replaced by 0.1 mole N-($\alpha$-methylphenethyl)phthalamic acid, 0.1 mole N-methoxyphenyl)phthalamic acid, and 0.2 mole N-phenyl-N-ethylphthalamic acid (procedure scaled up accordingly), respectively, and there is thereby obtained the potassium salt of 6-(N-$\alpha$-methylphenethyl-N'-phthalamido)penicillanic acid, 6-(N-2-methoxyphenyl-N'-phthalamido)-penicillanic acid, 6-(N-phenyl-N-ethyl-N'-phthalamido)penicillanic acid, respectively, each of which is isolated as a solid potassium salt which is found to contain the β-lactam ring as shown by infrared analysis and to inhibit *Staph. aureus* Smith at concentrations of 3.1 mcg./ml., 4.4 mcg./ml., and 3.12 mcg./ml., respectively.

EXAMPLE 25

In the general procedure of Example 12, the N,N-pentamethylenephthalamic acid is replaced by 0.1 mole N-(2-methyl-5-ethylpiperidino)phthalamic acid, N-pyrrolidinophthalamic acid, N-(2-methylpyrrolidino)phthalamic acid, and N-(2,5-dimethylpyrrolidino)phthalamic acid, respectively, and there is thereby obtained the potassium salt of 6-[N-(2-methyl-5-ethylpiperidino)-N'-phthalamido]penicillanic acid, 6 - (N - pyrrolidino - N'-phthalamido)penicillanic acid, 6-[N-(2-methylpyrrolidino)-N'-phthalamido]penicillanic acid, and 6-[N-(2,5-dimethylpyrrolidino)-N'-phthalamido]penicillanic acid, respectively, each of which is isolated as a solid potassium salt which is found to contain the β-lactam ring as shown by infrared analysis and to inhibit *Staph. aureus* Smith at concentrations of 0.001% by weight.

EXAMPLE 26

In the general procedure of Example 12, the N,N-pentamethylenephthalamic acid is replaced by 0.1 mole N,N-hexamethylenephthalamic acid and there is thereby obtained the potassium salt of 6-(N,N-hexamethylenephthalamido)penicillanic acid which is isolated as a solid potassium salt, found to contain the β-lactam ring as shown by infrared analysis and to inhibit *Staph. aureus* Smith at concentrations of 0.001% by weight.

EXAMPLE 27

In the general procedure of Example 13, the N-isopropylphthalamic acid is replaced by 0.078 mole N-(1,1,3,3-tetramethylbutyl)phthalamic acid, N-cyclohexylphthalamic acid, N-(3-morpholinopropyl)phthalamic acid, and N-(2-methylpiperidino)phthalamic acid, respectively, and there is thereby obtained the potassium salt of 6-[N-(1,1,3,3 - tetramethylbutyl) - N' - phthalamido]penicillanic acid, 6-(N-cyclohexyl-N'-phthalamido)penicillanic acid, 6-[N-(3-morpholinopropyl)-N'-phthalamido]penicillanic acid, and 6-[N-(2-methylpiperidino)phthalamido]penicillanic acid, respectively, each of which is isolated as a solid potassium salt which is found to contain the β-lactam ring as shown by infrared analysis and to inhibit *Staph. aureus* Smith at concentrations of 2.2 mcg./ml., 2.2 mcg./ml., and >6.25 mcg./ml., respectively.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:

1. A member selected from the group consisting of the acids having the formula

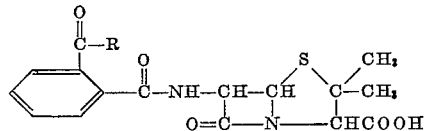

wherein R is a member selected from the group consisting of alkylamino, dialkylamino, cycloalkylamino, having from 3 to 7 carbon atoms inclusive, allylamino, diallylamino, phenyl(lower)alkylamino, morpholino, lower(alkyl)morpholino, di(lower)alkyl - morpholino, morpholino(lower)alkylamino, pyrrolidino, (lower)alkylpyrrolidino, di(lower)alkylpyrrolidino, N,N-hexamethyleneimino, piperidino, lower(alkyl)piperidino, di(lower)-alkylpiperidino, 1,2,5,6-tetrahydropyridino, N-(lower)-alkylpiperazino, N-phenylpiperazino, N-(lower)alkyl-(lower)alkylpiperazino, N-(lower)alkyl-di(lower)alkylpiperazino, furfurylamino, tetrahydrofurfurylamino, N-(lower)alkyl-N-furfurylamino, N-alkyl-N-anilino, and (lower)alkoxyanilino and their sodium, potassium, calcium, aluminum and ammonium salts and their nontoxic substituted ammonium salts with an amine selected from the group consisting of tri(lower)-alkylamines, procaine, dibenzylamine, N-benzyl-beta-phenethylamine, 1-ephenamine, N,N'-dibenzylethylenediamine, dehydroabietylamine, N,N'-bis-dehydroabietylethylenediamine and N-(lower)alkylpiperidine.

2. 6-(N-allyl-N'-phthalamido)penicillanic acid.
3. 6-(N-benzyl-N'-phthalamido)penicillanic acid.
4. 6-(N-amyl-N'-phthalamido)penicillanic acid.
5. 6-(N-n-propyl-N'-phthalamido)penicillanic acid.
6. 6-(N-isopropyl-N'-phthalamido)penicillanic acid.
7. 6-(N-t-butyl-N'-phthalamido)penicillanic acid.

References Cited in the file of this patent

UNITED STATES PATENTS 2,951,839    Doyle et al. _____ Sept. 6, 1960